3,098,805
PROCESS FOR THE EXTRACTION OF RELATIVELY PURE TITANIUM AND OF RELATIVELY PURE ZIRCONIUM AND HAFNIUM
Guy Ervin, Jr., and Herbert F. G. Ueltz, Shrewsbury, Mass., assignors to Norton Company, Worcester, Mass., a corporation of Massachusetts
Filed June 25, 1959, Ser. No. 822,797
20 Claims. (Cl. 204—64)

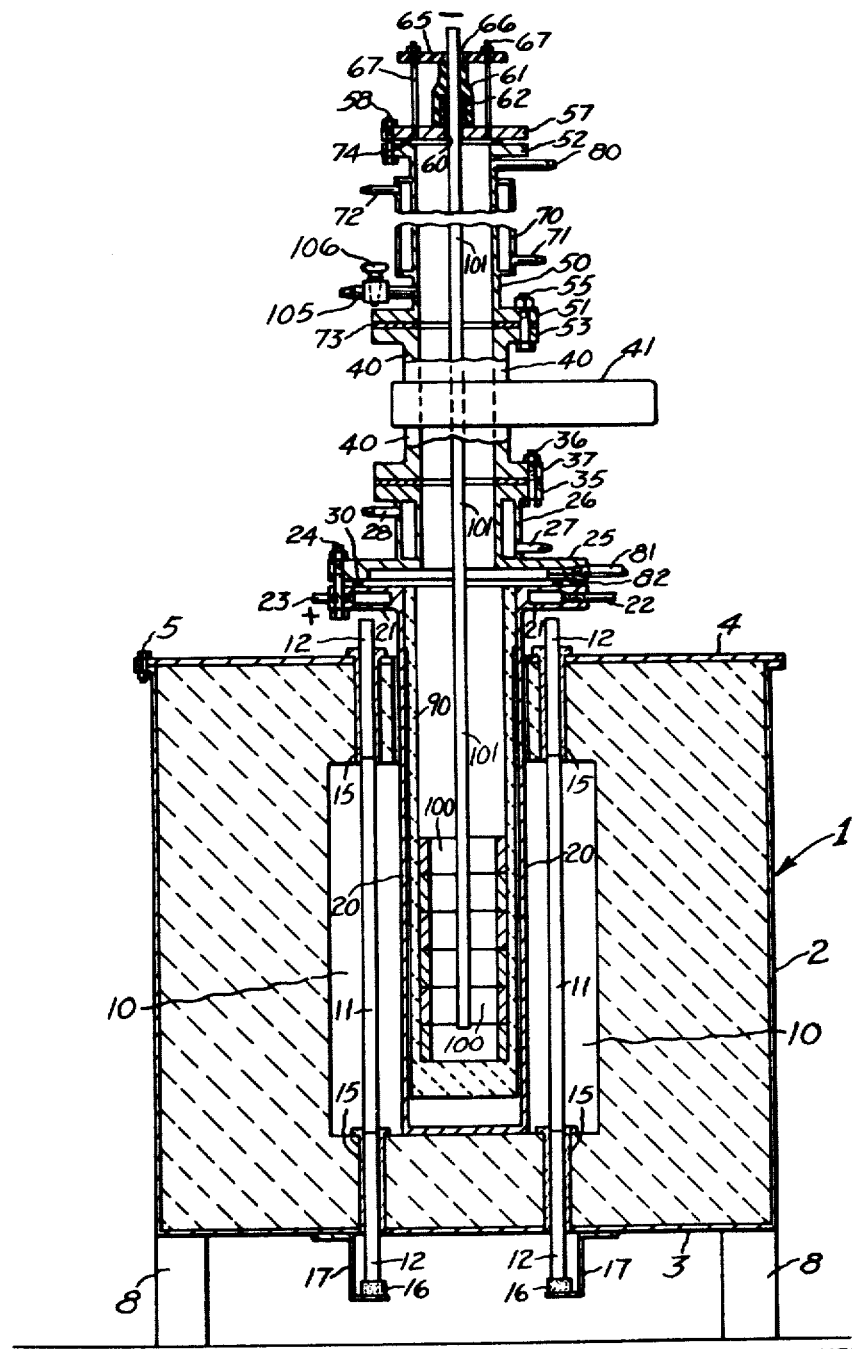

The invention relates to the extraction of relatively pure titanium, relatively pure zirconium and hafnium. This application is a continuation in part of our copending application (titanium) Serial #394,753, filed November 27, 1953, now abandoned, which was a continuation in part of our copending application Serial #313,172, filed October 4, 1952, now abandoned; and this application is also a continuation in part of our copending application (zirconium and hafnium) Serial #521,259, filed July 11, 1955, now abandoned, which was a continuation in part of our copending application Serial #313,171, filed October 4, 1952, now abandoned.

One object of the invention is to provide a thoroughly practical and commercial process for the extraction of these metals which process can be operated at relatively low cost.

Another object of the invention is to provide a process of the nature indicated utilizing a simple apparatus which is quite safe to operate. Another object of the invention is to provide a process of the nature indicated in which a single step only is required for transforming titanium carbide directly into these metals in such a way that there is no opportunity for contamination by oxygen or nitrogen or other undesirable impurities that are difficult to remove. Another object of the invention is to produce these metals in relatively large grain size by means of a simple process.

Another object is to produce metal of superior characteristics for the manufacture of certain parts of air frames. Another object is to produce corrosion resistant metal. Another object is to produce metal of excellent properties for chemical apparatus. Another object is to produce metal which is highly refractory, which has a high tensile strength and which is quite ductile, thus making it valuble for the production of certain air frame parts and of certain missile parts, especially where high speeds are involved and which is useful also for the same reason for certain engine parts.

Titanium is now extensively used for the manufacture of air frames, of aircraft engines and of missiles, meaning rockets, because of the qualities above indicated. However its cost is still high. Zirconium with its small hafnium content is highly resistant to corrosion and is therefore very useful for the manufacture of chemical apparatus of certain kinds but its cost is still high.

Other objects will be in part obvious or are in part pointed out herein.

The accompanying drawing is a vertical axial sectional view of electrolytic apparatus for carrying out the process of the invention for extraction of any of these metals from their carbides.

Present processes used commercially for separating zirconium and hafnium produce hafnium-free zirconium oxide and zirconium-free hafnium oxide. These oxides are then converted to chlorides and reduced with magnesium or sodium to metal. The refined oxides could equally well be converted to carbides and used as feed for our electrolytic process to produce hafnium-free zirconium metal or zirconium-free hafnium metal.

The reduction of zirconium oxide in the electric furnace with coke is now an every day affair and the zirconium oxide thus reduced to zirconium carbide contains a small portion of hafnium oxide which is reduced to hafnium carbide mixed with the zirconium carbide. Hence there is no problem in converting the oxides of zirconium and hafnium to their carbides each free of the other one.

We have discovered a process for producing relatively pure metal of the kinds indicated the basis for which is the electrolytic deposition of metal in an electrolytic cell having a consumable anode made of carbide of the metal. The electrolytic bath is composed of fused salt which is halide of metal selected from the group consisting of the alkali metals and alkaline earth metals including magnesium and mixtures of such halides. Also we prefer to provide a small amount of double halide of alkali metal and the metal in question. This accelerates the process and produces purer metal. It makes larger crystals. The fluorides are the most practical of the halides which are double salts of alkali metal and the metal involved and potassium is the most practical of the alkali metals. Thus we prefer either $K_2TiF_6$ or $K_2Zr(Hf)F_6$ meaning by the latter the double salt of one or the other metal or of both. The melting points of the chlorides of the alkali and alkaline earth metals are shown in the following table.

TABLE I

| Chloride: | Melting point, degrees centigrade |
|---|---|
| Sodium chloride, NaCl | 804 |
| Potassium chloride, KCl | 776 |
| Lithium chloride, LiCl | 613 |
| Rubidium chloride, RbCl | 715 |
| Cesium chloride, CsCl | 646 |
| Magnesium chloride, $MgCl_2$ | 712 |
| Calcium chloride, $CaCl_2$ | 772 |
| Strontium chloride, $SrCl_2$ | 873 |
| Barium chloride, $BaCl_2$ | 962 |

As can be seen from the table, lithium chloride has the lowest melting point. It also tends to confer still lower melting points on mixtures through the formation of eutectics. We have used a eutectic mixture of 40 mols of potassium chloride and 60 mols of lithium chloride, having a melting point of about 350° C. We later, however, found that a satisfactory salt for the bath is common salt NaCl and of course this is the cheapest of all salts. In addition it is easily obtained in an anhydrous condition and its melting point is low enough in view of the fact that we have found that for the best results the temperature of the bath should be over 800° C. and we use an even higher temperature to avoid freezing of the salt by unavoidable variations in temperature. A preferred temperature, 850° C., is still low enough for an economical operation, all things considered.

For the extraction of titanium, titanium is obviously the ideal metal for the cathode. So also zirconium is the ideal metal for the cathode for the extraction of zirconium. This means zirconium with its hafnium content in most cases although pure zirconium could be used and also pure hafnium. But stainless steel is satisfactory in some cases. Titanium plated stainless steel is almost as good as titanium and zirconium plated stainless steel is almost as good as zirconium. Other metals or alloys which are refractory enough to withstand the temperatures involved can be used provided they are resistant to free halogen and to the fused halide and will not alloy with the metal produced. We have used nickel, and tungsten and prefer tungsten. Molybdenum might be satisfactory. Obviously other metals could be used and so we shouldn't be limited to any one.

One apparatus, and the best one now known to us, in which the process of this invention can be carried out is illustrated in the drawing. A refractory box 1 consisting of a sheet steel cylinder 2, to the bottom of which is welded a bottom plate 3 and having a top plate 4 secured thereto by bolts 5, is filled with refractory brick. The box 1 is shown as supported by legs 8. Through a space 10 in the brick extend resistor bars 11 made of silicon carbide of a type now well known, these bars having so-called cold ends 12 as such bars practically always do. The cold ends 12 extend through alumina sleeves 15 that extend through the top plate 4 and the brick to receive the upper cold ends 12 and through the brick and the bottom plate 3 to receive the lower cold ends 12. The lower cold ends 12 are supported by refractory blocks 16 which rest upon the lower horizontal portions of Z shaped irons 17 the upper horizontal portions of which are welded to the bottom plate 3. Electrical connections are made to the cold ends 12, but there are well known and are not shown. By energizing the bars 11 the temperature in the cell 20 can be brought to the desired level.

The cell 20 is made of steel. It has a hollow flange 21 through which cooling water is pumped by means of connections 22 and 23. It is bolted by means of bolts 24 to a head plate 25 having a hollow upward extension 26 through which water is pumped by means of connections 27 and 28. The head plate 25 is sealed to the flange 21 by means of a ring 30 between these parts. The ring 30 is made of chlorinated butadiene.

The extension 26 has a flange 35 which is bolted by means of bolts 36 to a flange 37 on the bottom of a pipe shaped valve body 40 transversed by a vacuum seal valve apparatus 41 which can be operated to seal off the space below it. This valve apparatus 41 is not shown in detail as it belongs in another art and any good one can be used.

Extending upwardly from the valve body 40 is a water cooled pipe 50. This is provided to allow the top of the apparatus to become relatively cool. This pipe 50 has a bottom flange 51 and a top flange 52, and from the bottom of the former to the top of the latter the pipe 50 is two feet high. The flange 51 is bolted to an upper flange 53 provided on the top of the valve body 40 by means of bolts 55. The flange 52 is bolted to a plate 57 by means of bolts 58. The plate 57 has a central hole 60 and above this central hole 60 is a rubber sealing tube 61 the lower part of which is reinforced with a steel sleeve 62. The rubber sealing tube 61 is held down onto the plate 57 by means of a laminated cloth and phenolic resin plate 65 having a hole 66 therethrough, hold down bolts 67 extending between the plate 57 and the plate 65 being provided to hold these plates together.

The water cooled pipe 50 is cooled by a water chamber 70 welded thereto and connections 71 and 72 to circulate the water. A gasket 73 is provided between the flanges 57 and 53 and a sealing ring 74 is provided between the flanges 57 and 52, both of these being made of chlorinated butadiene. It is important to keep the system free of air, that is to exhaust the air before starting the electrolysis and to remove any contaminating atmosphere which may be generated during the electrolysis. To that end we pump through the system argon or other inert gas by way preferably of an upper pipe 80 exhausting the gas through a lower pipe 81, the former for example extending into the top of the pipe 50 and the latter into the flange 25 and connected to a bore 82 extending to the inside of the extension 26. We find it is preferable to have the argon entrance above the argon exit to drive salt vapor downwardly to keep it from plugging the upper part of the apparatus. The system should be flushed with argon before starting electrolysis desirably for about twenty-four hours. Argon is pumped all of the time during electrolysis (but could be interrupted for short periods). In an apparatus of this size a flow of argon of two cubic feet per hour is satisfactory.

The steel cell 20 (an ordinary low carbon steel was used) was six inches inside diameter. The extension 26, made of the same steel, had an inside diameter of four inches and so did the valve body 40 and the pipe 50. All of these parts were made of the same steel except the body 40 which was made of aluminum. Dimension of the apparatus not mentioned can be calculated closely by scaling the drawing relative to a dimension given. The cell 20 was Nichrome plated on the outside, by flame spraying.

Fitted into the cell 20 is a graphite crucible 90 and the drawing sufficiently shows its shape and position. Inside of the graphite crucible 90 is a long sleeve made up of a series of anode rings 100 of metal carbide of Table I, bonded with pitch in the manner to be particularly described. The anodes actually used consisted of six rings 100 each having an inside diameter of seven and three-quarters inches, an outside diameter of nine and three-quarters inches and 2.5 inches high. It will be understood that the apparatus details are no part of the present invention.

A long rod shaped cathode 101 extends in an axial position relative to the cell 20 the crucible 90 and the sleeve 100, vertically from close to the bottom of the anode 100 through the extension 26, through the valve body 40, through the valve mechanism 41 when the valve thereof is open, through the pipe 50, through the hole 60, through the rubber sealing tube 61 and through the hole 66, projecting a slight distance above the plate 65. There it is connected by a clamp to the negative side of a source of direct current electrical energy as indicated by the negative sign — above its top. The cell 20 and therefore also, through the crucible 90, the anode 100 is connected by electrical connections to the other side of the circuit which is therefore a source of positive electricity as indicated by a positive sign + close to the bottom of the bolt 24 that is shown; a convenient place to make the connection. But any way of connecting the anode 100 to the positive side of the source is satisfactory.

The cathode is withdrawn from time to time to collect metal deposited thereon. To do this it is first drawn upwardly through the sealing tube 61 until its bottom has cleared the valve mechanism 41. Then the valve is closed. After an interval of time usually about an hour to allow the cathode 101 where the metal has collected thereon and said metal to cool down enough to avoid reaction with the air, the plate 65 is unbolted and lifted up and off the cathode 101, and then the cathode 101 with the deposit of metal is entirely removed from the system, and the metal is scraped off and colletced for further processing which need not be described herein. Briefly such processing involves dissolving off the salt clinging to the metal, pressing the sponge metal so clean of salt, melting it in a vacuum and casting ingots, or, instead of melting and casting the metal, it can be pressed and sintered to form articles.

While the bottom of the cathode 101 and the metal thereon is cooling in the valve body 40 and pipe 50, argon or other inert gas is pumped from the pipe 80 to an exhaust pipe 105 having a valve 106 so that it can be opened at this time nad closed when the cathode 101 is down and the process is operating.

*Examples of the Process for the Production of Titanium*

The titanium carbide may be ordinary commercial material. This compound is made in large quantities in arc furnaces out of rutile and coke. The resulting pig is many tons in size, is crushed to pass through a 100 mesh screen, the iron being removed by acid washing and such titanium carbide has the following typical analysis:

TABLE II

| | Percentage by weight |
|---|---|
| Titanium | 65.90 |
| Carbon | 31.02 |
| Iron | 0.12 |

After acid washing, the 100 mesh titanium carbide is blended with powdered hard pitch by rolling the mixture in the proportion 85% by weight of TiC and 15% by weight of pitch in a fiber drum on a roller mill for two hours. This forms a free flowing stable mixture which does not stick together under storage at room temperature. The pitch used was a pulverized hard pitch, a by-product of a coking oven with the lower volatiles removed by distillation. It has a melting point in the range of 285° F. to 315° F.

The above proportion of titanium carbide and pitch depends upon the particle size of the titanium carbide. If the latter is of very fine particle size, it requires more pitch; if it is coarser, it requires less. In general it is desirable to have as much pitch as possible in the mix short of that amount which would cause the rings to slump during baking.

The mixture of TiC and pitch is pressed into rings 100 and a pressure of three tons to the square inch was used. The rings were then placed in a graphite crucible and heated in argon to 600° C. at a 200° rise per hour and then gradually raised to 1000° C. and held at that temperature for four hours.

The rings pick up a small amount of iron from the steel mold in which they are pressed. This is removed by acid treatment. One satisfactory way is to place the rings in a 1:9 by volume solution of C.P. concentrated hydrochloric acid in distilled water and then to heat it to just below the boiling point of water, then to rinse the rings several times with distilled water and dry them. They were dried at 200° F.

The graphite crucible 90 was machined from extruded graphite manufactured for electrodes. We found this contained a substantial quantity of iron so we removed as much of the iron as we could by acid treatment of the crucible in the same way as the rings 100 were acid treated. For the future we recommend using graphite with low iron content, there being available National Carbon Grade AUC graphite which has only between 0.0025 and 0.013 percent of iron.

It is desirable that the graphite crucible be free of interconnecting pores so that liquid will not flow through it. We did this by chemically precipitating calcium fluoride directly into the pores of the graphite by reacting a 10 molar potassium fluoride solution with a 5 molar calcium chloride solution. This was done as follows:

The KF solution was placed in the crucible and allowed to soak into the pores. This was poured out after a brief 10 minute period and replaced by the $CaCl_2$ solution. The $CaCl_2$ solution was allowed to soak into the pores on top of the remaining KF and form the precipitate of $CaF_2$. The $CaCl_2$ solution was poured out after a 10 minute period and the KF solution was poured back in again. This time a gasket and cap were bolted on top of the crucible and the system was placed under 10 pounds of air pressure. This forced the liquids further into the pores. After standing for 30 to 60 minutes the KF was poured out, the crucible was sponged lightly to remove excess solution and the $CaCl_2$ solution was poured back in. Alternation of KF and $CaCl_2$ solutions was repeated until the liquid level on the inside of the crucible showed no decrease. The crucible was sponged lightly after each solution to remove KCl solution formed in the reaction and to allow the precipitation to take place deeper in the pores. The last solution in the crucible was the KF solution since both K and F are common ions in the electrolyte. The impregnated crucible was rinsed thoroughly with distilled water and dried in a circulating air oven.

Although the impregnated crucible had been dried in the oven a great deal of moisture still remained in the pores. This had been the cause of failure in some of the earlier runs. The best way to remove all traces of moisture is to place the crucible in the cell, seal the cell, turn the temperature to 400° C. and evacuate the system. The moisture pickup in a Dry Ice-acetone trap was high and frequent removal of the ice in the trap was necessary to prevent the vacuum line from plugging up. When the Dry Ice trap showed no further pickup of moisture the crucible was then ready for electrolysis.

Although the cell 20 can be made of steel, for replacement ordinary iron pipe metalilzed on the exterior of the hot zone was used. By hot zone we mean the cylindrical surface from the bottom of the cell to the top of the space 10. First about 0.010 inch of Nichrome was flame sprayed onto the surface and this was followed by about 0.005 inch of aluminum flame sprayed thereon. After this a coating of aluminum flake paint was applied with a paint brush. Prior to the flame spraying of the coating of Nichrome, the surface of the cell was roughened by sand blasting with coarse angular grit. Cells so made operated in a clean air atmosphere lasted for many runs before they required recoating.

The foregoing description covers all of the examples for the production of titanium. We will now give the details of specific runs by way of examples.

EXAMPLE I

The electrolyte was a mixture of 85% sodium chloride and 15% of potassium titanium fluoride. The sodium chloride was USP grade which is a great deal better than 99% pure. The $K_2TiF_6$ was a recrystallized commercial grade, contained .01% of iron and no other impurities that we were concerned with. The cell was filled with this salt up to the top of the rings 100. All parts except the cathode 101, which in this case was made of titanium, being in place as shown in the drawing, the resistor bars 11 were energized with electricity and the cell was gradually heated to a temperature of 900° C. which of course melted the salt mixture. Then the cathode 101, having been just above the valve 41, was lowered through the open valve to the position shown in the drawing. The argon had been turned on before the salt was melted and continued to flow throughout the process. The argon was flowing at the rate of the order of two cubic feet per hour but we don't have any exact figures.

These things having been done, the cell was energized with direct current electricity at five volts from the cell to the cathode 101. The cell was operated with 800 amperes for 22.8 hours. The current density was 240 amperes per square decimeter.

Then the cathode with its deposit of titanium crystals was raised above the valve 41 again. In each case we mean that the bottom of the cathode was just above the valve 41. The valve 41 was closed and then the cathode in the pipe 50 was allowed to cool to room temperature and then removed from the apparatus.

The deposit from the electrolysis was removed by chipping it off with a hammer onto a large sheet of paper. The chunks of deposit were pulverized with a mortar and pestle. The powdered sample was then weighed to the exact weight, placed in distilled water and the salt was leached out. After four water rinses, to dissolve the electrolyte, there was no indication of reaction with the dilute leaching acid. The metal was then leached with a 1:49 by volume solution of C.P. concentrated hydrochloric acid in distilled water and agitated in a Waring blender for two minutes. This was followed by four distilled water rinses and two C.P. acetone rinses and the metal was allowed to dry. The fines from each rinsing operation were collected on a filter paper in a Buchner funnel over a large vacuum filter flask.

From the weight of metal, including the filter paper fines and the weight of pulverized sample the percent metal in the deposit was determined. This was then applied to the whole deposit for the quantity of titanium produced from which the efficiency was calculated. Samples of the processed metal were taken for chemical analysis and hardness values.

Further statisctis and recapitulation of some of those already given are found in the following table:

TABLE III

| | |
|---|---|
| Current | 800 amps. |
| Voltage (average) | 5.0 volts. |
| Quantity of current | 18,240 ampere hours. |
| Power consumption (D.C.) | 13.0 kw. hours/lb. |
| Efficiency | 39.2%. |
| Approximate exhaustion of Ti in the anode | 72%. |
| Amount of metal in the deposit | 43.4% (remainder salt). |
| Amount of metal produced | 7.0 pounds. |
| Analysis of metal: | 99.2 (estimate). |
| Ti | 0.57%. |
| Fe | 0.05%. |
| C | 0.16% (McKinley's |
| $O_2+N_2$ | tables from BHN). |
| Hardness of metal | 196 BHN. |

The titanium so made can be melted and cast but that is really another subject. After casting it can be drawn and forged or otherwise worked and machined.

The Brinell hardness BHN is the principal criterion of usefulness of the metal. At the time this run was made the Brinell hardness of 200 was acceptable. The lower the Brinell hardness, the more ductile and workable is the metal. Brinell hardness is the function of the amount of carbon, oxygen and nitrogen in the metal and these should be kept to a minimum. Iron also makes titanium brittle and in later runs we were able to produce metal with less iron. Each time a run is made with a particular graphite crucible some more of the original oron is removed so that the more runs that are made the less iron is found in the titanium.

EXAMPLES II, III, IV, V

In these examples the apparatus was the same except it was smaller. For an understanding of the size of everything, the drawing being closely to scale, the six rings 100 had an inside diameter of 3¾ inches, an outside diameter of 4⁹⁄₁₆ inches and they were 2 inches high. There were four runs in these examples, the cell was filled with the same salt mixture to the top of the rings 100 in each case, everything was as described in Example I except for the differences as shown in the following table.

TABLE IV

| Example | II | III | IV | V |
|---|---|---|---|---|
| Run Number | 1 | 2 | 3 | 4 |
| Amperage | 300 | 300 | 300 | 300 |
| Voltage | 4.1 | 4.4 | 4.1 | 4.0 |
| Time, hours | 1.0 | 1.0 | 3.0 | 5.5 |
| Cathode Current Density, amps/dm.² | 220 | 220 | 220 | 245 |
| Wt. of Deposit, gms | 484 | 372 | 672 | 736 |
| Wt. of titanium in deposit, gms | 75 | 93 | 206 | 284 |
| Percent Ti in deposit | 16 | 25 | 31 | 38 |
| Efficiency, percent | 56 | 69 | 51 | 38 |
| Percent Soluble Ti in Electrolyte | 3.0 | | 3.0 | 2.6 |
| Percent Fe in electrolyte | 0.01 | | 0.01 | 0.01 |
| Percent Fe in titanium | 0.43 | 0.07 | 0.06 | 0.12 |
| Percent C in titanium | 0.22 | 0.10 | 0.06 | 0.08 |
| Percent $O_2+N_2$ (by McKinley method) | 0.7 | 0.21 | 0.13 | 0.11 |
| Percent Ti (estimated by difference) | 96.6 | 99.6 | 99.7 | 99.6 |
| Hardness, BHN | 440 | 201 | 160 | 154 |

In the above table the runs were sequential in the same apparatus with the same anode and the same electrolyte mixture, a little of which was added after each run to compensate for that removed with the cathode deposit, thus maintaining the electrolyte level at constant height in the cell. The metal purity increased as the runs continued. Example II was relatively higher in impurities since it was the first run with the new anode and more impurities were present in the cell and cell materials. Examples IV and V produced titanium metal of highest purity and lowest hardness.

EXAMPLE VI.—ZIRCONIUM

In this example the cathode was nickel rod covered with molybdenum foil located centrally in the cell. The specifications of the materials used, the material produced and the size of the anode are given in the following table:

TABLE V

| | |
|---|---|
| Anode | 28 mesh grit size ZrC and finer acid-washed, bonded with 4.4% pitch molded to a hollow cylinder 2" O.D., 1½" I.D., 6" high and baked in argon at 1000° C. |
| Electrolyte | 54% KCl, 46% LiCl. |
| Temperature | 850° C. |
| Current | 50 amperes. |
| Cathode current density | 2 amperes/sq. cm. |
| Voltage | 2.5 to 3.8. |
| Time | 2 hours—cathode changed 3 times. |
| Product | 16.3 grams Zr metal. |
| Current efficiency | 20%. |
| Purity | 0.13% carbon. |

The zirconium carbide had its normal content of hafnium carbide and the zirconium produced had its normal content of hafnium.

EXAMPLE VII.—ZIRCONIUM

This run was made with the apparatus of Example VI and the conditions were the same as in Example VI except that the current was 100 amperes for one-half hour. The product was 12.6 grams of zirconium metal; the current efficiency was 30%.

Titanium, zirconium and hafnium are similar in chemical characteristics and electronic structure. They have oxidation potentials that are very similar, showing the parallel nature of their electrolytic behavior.

Hafnium compounds are very difficult to separate from zirconium compounds, and material commercially called zirconium oxide really contains from 1% to 7% by weight of hafnium oxide which was originally associated with the zirconia in the naturally-occurring ore and is so much like zirconium oxide in its chemical properties that it is all referred to simply as zirconium oxide in commerical products. When these oxides are converted to corresponding metals, then the range of Hf in Zr as usually found becomes from about 1% to about 8% due to the much higher atomic weight of Hf than of Zr which results in a higher percentage of Hf present in $HfO_2$ than of Zf present in $ZrO_2$. However, reasonable pure $HfO_2$ and $ZrO_2$ can now be obtained that have been separated from each other by very special procedures.

With this as a background, it is understood that the word "zirconium" as used in this specification and claims may include up to about 8% of hafnium which is not considered as an impurity and is removed from consideration, even though it may be present, when terms such as "relatively pure zirconium" are used. Zirconium free from hafnium is also included in the term "zirconium."

One good way to start the electrolysis readily is to add refractory metal halide compound to the bath. In the case of titanium, a good compound for this purpose is $K_2TiF_6$. Such an added compound to give an amount of Ti in the bath in the vicinity of 1% to 5% by weight has proved satisfactory. Due to the higher atomic weight of zirconium and hafnium, this upper amount becomes about 10% by weight for zirconium and 19% by weight for pure hafnium. Of the alkali metals for the bath, lithium, sodium and potassium are considered to be best, and for the halides, chloride and fluoride have been used to good advantage. Fused bath temperatures in the general range 800° C. to 900° C. are convenient, but not necessary.

Titanium, zirconium and hafnium are related metals being transition metals of the fourth group of the periodic table. So far as now known they each have only one carbide, TiC, ZrC and HfC.

Although we have taught the extraction of titanium from its carbide and the extraction of zirconium-hafnium from their mixed carbide, there is no reason why a mixture of the carbides of titanium, zirconium and hafnium, or of the carbides of titanium and zirconium or of the carbides of titanium and hafnium cannot have the metal content extracted in the same way to produce an alloy of two or three of these metals as such alloys will probably be found useful in the future.

In picking the best mode to comply with the statute, the largest apparatus is probably the most economical and we would have used still larger ones had it not been for the expense. Example V produced the best titanium. Example VII for zirconium appears the best, but it varies as can be seen only slightly from Example VI. One hundred amperes gives greater efficiency than 50 amperes.

It will thus be seen that there has been provided by this invention a process for the extraction of relatively pure titanium and of relatively pure zirconium and hafnium in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawing is to be interpreted as illustrative and not in a limiting sense.

We claim:

1. Process for the preparation of metal selected from the fourth group consisting of titanium, zirconium and hafnium and mixtures thereof which comprises passing a direct electric current through a cell having a solid anode and a solid cathode in a direct current electric circuit, the electrolyte in said cell consisting, apart from any fourth group metal halide content, essentially of fused halide of metal selected from the group consisting of alkali metals and alkaline earth metals including magnesium and mixtures of such halides, said cell containing fourth group metal carbide in said halide electrically connected to the positive side of the electric circuit and collecting the fourth group metal electrolytically liberated at the cell cathode.

2. Process for the preparation of titanium which comprises passing a direct electric current through a cell having a solid anode and a solid cathode in a direct current electric circuit, the electrolyte in said cell consisting, apart from any titanium halide content, essentially of fused halide of metal selected from the group consisting of alkali metals and alkaline earth metals including magnesium and mixtures of such halides, said cell containing titanium carbide in said halide electrically connected to the positive side of the electric circuit and collecting the titanium metal electrolytically liberated at the cell cathode.

3. Process according to claim 1 in which the anode is made of said carbide.

4. Process according to claim 3 in which the major portion of the fused halide is chloride.

5. Process according to claim 4 in which the major portion of the fused halide is alkali metal halide.

6. Process according to claim 1 in which the major portion of the fused halide is chloride.

7. Process according to claim 6 in which the major portion of the fused halide is alkali metal halide.

8. Process according to claim 1 in which the major portion of the fused halide is alkali metal halide.

9. Process according to claim 8 in which the anode is made of said carbide.

10. Process according to claim 2 in which the anode is made of said carbide.

11. Process according to claim 10 in which the major portion of the fused halide is chloride.

12. Process according to claim 11 in which the major portion of the fused halide is alkali metal halide.

13. Process according to claim 2 in which the major portion of the fused halide is chloride.

14. Process according to claim 13 in which the major portion of the fused halide is alkali metal halide.

15. Process according to claim 2 in which the major portion of the fused halide is alkali metal halide.

16. Process according to claim 15 in which the anode is made of said carbide.

17. Process according to claim 1 in which the electrolyte, apart from any fourth group metal halide content, consists essentially of fused alkali metal halide in which the alkali metal is selected from the group consisting of lithium, sodium, potassium, and mixtures thereof, the halide is selected from the group consisting of chloride, fluoride and mixtures thereof, and the bath contains a halide of fourth group metal soluble in the molten electrolyte.

18. Process according to claim 2 in which the electrolyte, apart from any titanium halide content, consists essentially of fused alkali metal halide in which the alkali metal is selected from the group consisting of lithium, sodium, potassium and mixtures thereof, the halide is selected from the group consisting of chloride, fluoride, and mixtures thereof, and the bath contains halide of titanium soluble in the molten electrolyte to produce a weight concentration of Ti in the bath in the vicinity of 1% to 5% of the total bath weight.

19. Process for the preparation of zirconium which comprises passing a direct electric current through a cell having a solid anode and a solid cathode in a direct current electric circuit, the electrolyte in said cell consisting apart, from any zirconium halide content, essentially of fused halide of metal selected from the group consisting of alkali metals and alkaline earth metals including magnesium and mixtures of such halides, said cell containing zirconium carbide in said halide electrically connected to the positive side of the electric circuit and collecting the zirconium metal electrolytically liberated at the cell cathode, in which the electrolyte, apart from any zirconium halide content, consists essentially of fused alkali metal halide in which the alkali metal is selected from the group consisting of lithium, sodium, potassium and mixtures thereof, the halide is selected from the group consisting of chloride, fluoride and mixtures thereof, and the bath contains halide of zirconium soluble in the molten electrolyte to produce a weight concentration of zirconium in the bath in the vicinity of 1% to 10% of the total bath weight.

20. Process for the preparation of hafnium which comprises passing a direct electric current through a cell having a solid anode and a solid cathode in a direct current electric circuit, the electrolyte in said cell consisting, apart from any hafnium halide content, essentially of fused halide of metal selected from the group consisting of alkali metals and alkaline earth metals including magnesium and mixtures of such halides, said cell containing hafnium carbide in said halide electrically connected to the positive side of the electric circuit and collecting the hafnium metal electrolytically liberated at the cell cathode, in which the electrolyte, apart from any hafnium halide content, consists essentially of fused alkali metal halide in which the alkali metal is selected from the group consisting of lithium, sodium, potassium and mixtures thereof, the halide is selected from the group consisting of chloride, fluoride and mixtures thereof, and the bath contains halide of hafnium soluble in the molten electrolyte to produce a weight concentration of hafnium in the bath in the vicinity of 1% to 19% of the total bath weight.

No references cited.

UNITED STATES PATENT OFFICE
CERTIFICATE OF CORRECTION

Patent No. 3,098,805                              July 23, 1963

Guy Ervin, Jr., et al.

It is hereby certified that error appears in the above numbered patent requiring correction and that the said Letters Patent should read as corrected below.

Column 1, line 46, for "valuble" read -- valuable --; column 4, line 58, for "nad" read -- and --; column 7, TABLE III, line 5 thereof, for "Efficienty" read -- Efficiency --; lines 10 to 14 should appear as shown below instead of as in the patent:

```
Analysis of metal:
    Ti----------------99.2 (estimate)
    Fe----------------0.57%
    C-----------------0.05%
    O2+N2-------------0.16% (McKinley's
                            tables from BHN)
``` column 7, line 31, for "oron" read -- iron --; column 8, line 41, for "reasonable" read -- reasonably --.

Signed and sealed this 5th day of May 1964.

(SEAL)
Attest:

ERNEST W. SWIDER                         EDWARD J. BRENNER
Attesting Officer                       Commissioner of Patents